(12) United States Patent
Nagahama

(10) Patent No.: US 7,292,289 B2
(45) Date of Patent: Nov. 6, 2007

(54) LIQUID CRYSTAL DISPLAY

(75) Inventor: Hiroshi Nagahama, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 10/534,714

(22) PCT Filed: Nov. 14, 2002

(86) PCT No.: PCT/JP02/11890

§ 371 (c)(1),
(2), (4) Date: Oct. 6, 2005

(87) PCT Pub. No.: WO2004/044645

PCT Pub. Date: May 27, 2004

(65) Prior Publication Data

US 2006/0152101 A1    Jul. 13, 2006

(51) Int. Cl.
  *G02F 1/1333*    (2006.01)
  *G02F 1/1345*    (2006.01)
(52) U.S. Cl. .......................................... 349/58; 349/151
(58) Field of Classification Search ................... 349/58, 349/151
  See application file for complete search history.

(56) References Cited

U.S. PATENT DOCUMENTS 5,739,887 A    4/1998    Ueda et al.
5,946,062 A  *  8/1999    Hasegawa et al. ............ 349/58
2002/0008815 A1  1/2002    Hanakawa et al.

FOREIGN PATENT DOCUMENTS

| EP | 0 911 681 A1 | 4/1999 |
|---|---|---|
| JP | 11-183925 | 7/1999 |
| JP | 11-202804 | 7/1999 |
| JP | 2001-312225 | 11/2001 |
| JP | 2002-072256 | 3/2002 |
| JP | 2003-195362 | 7/2003 |

* cited by examiner

*Primary Examiner*—James A. Dudek
(74) *Attorney, Agent, or Firm*—McDermott Will & Emery LLP

(57) ABSTRACT

A liquid crystal display device (L) according to the present invention comprises a liquid crystal display panel (1) having one or more wires on a substrate (1B) thereof, and a housing having holding portions (120a) to (120h) configured to hold opposing end portions of the liquid crystal display panel, wherein a spacing (H2) between a portion of an outermost wire (20a) or (20i) of the one or more wires which is located in the vicinity of the holding portion and a portion of an edge of the substrate which is located in the vicinity of the holding portion is larger than a spacing (H1) between a portion of the outermost wire which is other than the portion located in the vicinity of the holding portion and a portion of the edge of the substrate which is other than the portion located in the vicinity of the holding portion.

3 Claims, 5 Drawing Sheets

LIQUID CRYSTAL DISPLAY

TECHNICAL FIELD

The present invention relates to a liquid crystal display device in which a liquid crystal display panel is mounted.

BACKGROUND ART

Recently, a liquid crystal display device has been widely used as an image display device of an information device such as a notebook-type personal computer, a word processor and the like, or an image display device of a video device such as a fixed or portable television, a video movie, a car navigation system and the like, by taking advantage of a characteristic in which the liquid crystal display device is small, light and thin, and consumes small electricity. And, a liquid crystal display panel mounted in these liquid crystal display devices typically has a plurality of semiconductor devices in order to achieve a small liquid crystal display device and a high-definition image. A Chip On Glass process (hereinafter, referred to as a COG process) is commonly used for mounting these semiconductor devices.

The COG process is one type of process for mounting the semiconductor devices on a substrate. Specifically, in the liquid crystal display panel to which the COG process is applied, the semiconductor devices such as a source driver, a gate driver and the like are directly mounted on a non-display region of the substrate forming the liquid crystal display panel, by means of an anisotropic conductive adhesive. The liquid crystal display panel is provided with wires through which an image signal processed at the semiconductor devices is outputted to source lines (signal lines) and gate lines (scan lines) provided on the display region, and wires through which the image signal is inputted to the semiconductor devices. And, these wires are on the same flat plane of the non-display region of the substrate forming the liquid crystal display panel. In the liquid crystal display panel thus structured, the image signal externally inputted is inputted to the semiconductor devices, and the image signal processed at the semiconductor devices is outputted to the source lines and the gate lines. Consequently, an image according to the image signal is displayed on the display region of the liquid crystal display panel.

Such liquid crystal display device typically has a structure in which the liquid crystal display panel is illuminated from behind by a built-in lighting unit for obtaining a bright display screen. And, an edge light type in which a light guiding plate is disposed on a rear surface of the liquid crystal display panel, and a linear light source such as a fluorescent discharge tube is disposed on an end face of the light guiding plate is suitably employed as the lighting unit. This is because, the edge light type advantageously achieves a thin liquid crystal display device and a light emitting surface with a highly uniform luminance, and therefore is optimal as a back light of the liquid crystal display device used in the notebook-type personal computer or the like. And, in the liquid crystal display device used in the portable television, the car navigation system and the like, the edge light type using two or more fluorescent discharge tubes, or the edge light type using an L-shaped or U-shaped fluorescent discharge tube or the like, is commonly adopted considering a portability, a high luminance thereof, and the like.

FIG. 4 is a plan view showing a structure of a conventional liquid crystal display device having the liquid crystal display panel to which the COG process is applied. And, FIG. 5 is a cross-sectional view taken along line IV-IV in FIG. 4. Herein, FIG. 4 shows a condition in which a front cover is eliminated. In FIG. 4, X-axis, Y-axis, and Z-axis directions are defined as shown in the drawing. And, in FIG. 5, as a matter of convenience, a direction of the liquid crystal display device is shown as in the drawing.

A conventional liquid crystal display device L illustrated in FIG. 4 comprises a rectangular liquid crystal display panel 1 configured to display an image according to an applied image signal, a housing 4 configured to support the liquid crystal display panel 1 in X-axis, Y-axis, and Z-axis directions, and a flexible printed circuit board 3 configured to transmit the image signal to the liquid crystal display panel 1.

As shown in FIG. 4, the liquid crystal display panel 1 is provided with a display region 1a for displaying an image, and a non-display region 1b located outside of the display region 1a. And, source drivers IC1 to IC3 and a gate driver IC4, each of which is a driving semiconductor device configured to drive the liquid crystal display panel 1, are mounted on predetermined positions of the non-display region 1b. These semiconductor devices are mounted to electrode terminals (not shown) formed to predetermined positions of the non-display region 1b by the COG process. And, a plurality of wires (not shown) extend from the electrode terminals to which the source drivers IC1 to IC3 and the gate driver IC4 are mounted, and are electrically connected to the source lines and the gate lines (not shown) provided on the display region 1a of the liquid crystal display panel 1. And, wires 2a to 2i extend in predetermined shapes from the electrode terminals to which the source drivers IC1 to IC3 and the gate driver IC4 are mounted, and are electrically connected to flexible printed circuit board connecting electrode terminals (not shown) formed on predetermined positions of the non-display region 1b. Meanwhile, wires 2a' to 2i' capable of being electrically connected to the wires 2a to 2i formed on the non-display region 1b of the liquid crystal display panel 1 are formed on the flexible printed circuit board 3, and electrode terminals (not shown) are formed on end portions of the wires 2a' to 2i' on a liquid crystal display panel 1 side. And, the liquid crystal display panel 1 and the flexible printed circuit board 3 are integral with each other such that the corresponding electrode terminals are electrically connected by means of the anisotropic conductive adhesive.

And, as shown in FIG. 4, supporting portions 4a to 4h are formed on predetermined positions of the housing 4. Each of the supporting portions 4a to 4h is formed to have a rectangular cross-section, and to protrude from predetermined positions of the housing 4 in parallel with the Z-axis and with the same height. The liquid crystal display panel 1 is disposed on the predetermined position of the housing 4 in such a manner that end faces a to d of a substrate 1B of the liquid crystal display panel 1 and adjacent end faces e and f of an opposed substrate 1A of the liquid crystal display panel 1, contact side wall surfaces of the supporting portions 4a to 4h formed on the housing 4. In other words, the liquid crystal display panel 1 is fixed on the housing 4 in X-axis and Y-axis directions by means of the supporting portions 4a to 4h.

As shown in FIG. 5, the conventional liquid crystal display device L has a rectangular flat-plate-shaped transparent light guiding plate 5 configured to transmit light in a direction parallel to a principal surface thereof. And, a light source 6 is provided along one end face 5a of the light guiding plate 5 by a fixing means not shown. Furthermore, a reflecting sheet 7 is provided so as to enclose the light source 6 and to contact a lower surface and an opposing end face 5b of the light guiding plate 5. The reflecting sheet 7 encloses the light source 6 so as to be substantially in U-shape in cross-section. The reflecting sheet 7 is fixed to the light guiding plate 5 in such a manner that an adhesion surface 8 on one end portion of the reflecting sheet 7 is bonded to the light guiding plate 5 by a double face adhesive tape (not shown). In other words, in the liquid crystal display device L, the light source 6 is disposed along the end face 5a of the light guiding plate 5, and, the light source 6, the light guiding plate 5, and the reflecting sheet 7 compose an edge light type lighting unit UT.

A rear cover 10 is provided so as to contact a lower surface of the lighting unit UT. The rear cover 10 comprises a rectangular plate-shaped body portion 10a disposed to extend in a right-left direction, and rectangular plate-shaped vertical portions 10c and 10b formed to extend upward from right and left ends of the body portion 10a so as to have the same length. In other words, the lighting unit UT is provided so as to have predetermined spacings between the same and the vertical portions 10b and 10c of the rear cover 10, and to contact an upper surface of the body portion 10a of the rear cover 10. And, right and left housings 40a and 40b, each of which forms the housing 4, are respectively provided so as to contact left wall surfaces of the vertical portions 10c and 10b of the rear cover 10. These housings 40a and 40b comprise rectangular vertical portions 401a and 401b disposed to extend upwardly, respectively, and rectangular horizontal portions 402a and 402b disposed to extend in a right-left direction, respectively. A rectangular plate-shaped light correction sheet 9a for uniformizing light is provided so as to extend from a lower surface of a tip end portion of the horizontal portion 402a to a lower surface of a tip end portion of the horizontal portion 402b. And, the liquid crystal display panel 1 is provided so as to extend from an upper surface of the horizontal portion 402a to an upper surface of the horizontal portion 402b. The liquid crystal display panel 1 is fixed to the housing 4 in such a manner that predetermined regions thereof are bonded to the upper surfaces of the horizontal portions 402a and 402b. And, the supporting portions 4a and 4f are formed to protrude upward from predetermined positions of the horizontal portions 402a and 402b so as to have the same length. And, the liquid crystal display panel 1 is disposed on a predetermined position of the housing 4 in such a manner that the end faces a and c of the substrate 1B contact side wall surfaces of the supporting portions 4a and 4f, respectively, and the end face e of the opposing substrate 1A contacts the side wall surface of the supporting portion 4a. And, front covers 11a and 11b formed in L-shape in cross-section are provided so as to cover the non-display region 1B of the liquid crystal display panel 1 and the housings 40a and 40b. The front cover 11a is provided on an upper surface of the supporting portion 4f so as to have a minute spacing between the same and the upper surface of the liquid crystal display panel 1 and to have a minute spacing between the same and the left side wall surface of the vertical portion 401b of the housing 40b. The front cover 11b is provided on a right end face of the horizontal portion 402a of the housing 40a and on the right wall surface of the vertical portion 10c of the rear cover 10 so as to have a minute spacing between the same and the upper surface of the liquid crystal display panel 1.

The light guiding plate 5 is made of a material such as acrylic resin. And the reflecting sheet 7 is formed by a white resinous film having a light reflectivity, for example. Furthermore, the housing 4 is made of resin, such as polycarbonate, for example.

In the liquid crystal display device L thus structured, the lighting unit UT is supported by the rear cover 10, and the rear cover 10 and the light correction sheet 9a are supported by the housings 4. And, the liquid crystal display panel 1 is suitably supported by the housings 4.

And, the light emitted from the light source 6 enters the end face 5a of the light guiding plate 5. The light propagates within the light guiding plate 5 and emanates from the upper surface thereof. The light leaking out of the lower surface and the end face 5b of the light guiding plate 5 is returned into the light guiding plate 5 by means of the reflecting sheet 7. The light emanating from the upper surface of the light guiding plate 5 passes through the light correction sheet 9a, thereby achieving uniform intensity distribution. And, when the light which has passed the light correction sheet 9a is passing through the liquid crystal display panel 1, transmissivity of the light in the liquid crystal display panel 1 is controlled according to the image signal applied to the liquid crystal display panel 1, and thereby an image is displayed on the display region 1a of the liquid crystal display panel 1.

However, in the conventional liquid crystal display device thus structured, since the housing 4 is made of resin, the housing 4 is required to be formed with a certain thickness in order to satisfy mechanical strength thereof. This has impeded achievement of smallness and thinness which the liquid crystal display device L is required to provide. Recently, in order to solve the problem, an attempt has been made to form the housing 4 by a thin metal plate. However, if the housing 4 is formed by the thin metal plate, the liquid crystal display panel 1 is directly supported by metal. And, if an excessive impact stress or the like is applied to portions of the liquid crystal display panel 1 which contact the supporting portions 4a to 4h due to fall or the like after the liquid crystal display device L is finished, and in a manufacturing process of mounting the liquid crystal display panel 1, the portions of the liquid crystal display panel might break. And, when the end face of the liquid crystal display panel 1 is broken, and even one of the wires 2a to 2i provided on the non-display region 1b is damaged, the image signal is not properly transmitted, thereby causing a new problem that a normal image is not displayed on the liquid crystal display panel 1.

DISCLOSURE OF THE INVENTION

An object of the present invention is to provide a small, thin, and highly reliable liquid crystal display device capable of inhibiting generation of an abnormal image which may be caused by fall or the like.

In order to achieve the above object, according to the present invention, there is provided a liquid crystal display device comprising a liquid crystal display panel having one or more wires on a substrate thereof, and a housing having holding portions configured to hold opposing end portions of the liquid crystal display panel, wherein a spacing between a portion of an outermost wire of the one or more wires which is located in the vicinity of the holding portion and a portion of an edge of the substrate which is located in the vicinity of the holding portion is larger than a spacing between a portion of the outermost wire which is other than the portion located in the vicinity of the holding portion and a portion of the edge of the substrate which is other than the portion located in the vicinity of the holding portion.

In such a configuration, since the outermost wire of the one or more wires is provided to be spaced sufficiently apart from the portion of the edge of the substrate which is held by the holding portion, it becomes possible to inhibit occurrence of break of the wire in a case where the end portion of the substrate is damaged. Consequently, it becomes possible to inhibit a problem that a normal image is not displayed in a display region of the liquid crystal display panel.

In this case, spacing between the portion of the outermost wire of the one or more wires which is located in the vicinity of the holding portion and the portion of the edge of the substrate which is located in the vicinity of the holding portion is not less than 2 mm and not more than 5 mm.

In such a configuration, it becomes possible to inhibit occurrence of break of the wires provided on the substrate as long as the liquid crystal display device is normally used. Consequently, it becomes possible to inhibit occurrence of the problem that a normal image is not displayed in the display region of the liquid crystal display panel.

In this case, the spacing between the portion of the outermost wire which is other than the portion located in the vicinity of the holding portion and the portion of the edge of the substrate which is other than the portion located in the vicinity of the holding portion is less than 2 mm.

In such a configuration, a non-display region of the substrate can be effectively used to form the wires on the substrate.

And, in this case, a non-display region is formed on a peripheral portion of the liquid crystal display panel, and the outermost wire is provided on the non-display region to extend substantially along an end portion of the liquid crystal display panel.

In such a configuration, since probability that the outermost wire breaks becomes higher when the end portion of the substrate is damaged, for example, effect of the present invention is further enhanced.

And, in this case, the housing is made of metal.

In such a configuration, the housing can be made thinner than in a conventional art. In addition, since metal has also a shielding effect from an electromagnetic wave or the like, it becomes possible to inhibit occurrence of malfunction of a semiconductor device mounted on the substrate due to influence of the electromagnetic wave or the like emitted from a light source.

In this case, the housing is formed by a thin plate.

In such a configuration, the liquid crystal display device may be made smaller and thinner than in the conventional art. And the housing may be formed easily.

The object, as well as other objects, features and advantages of the present invention will become more apparent from the following detailed description of the preferred embodiments taken with reference to the accompanying drawings.

BEST MODE FOR CARRYING OUT THE INVENTION

Hereinafter, an embodiment of the present invention will be described with reference to drawings.

Figure 1:
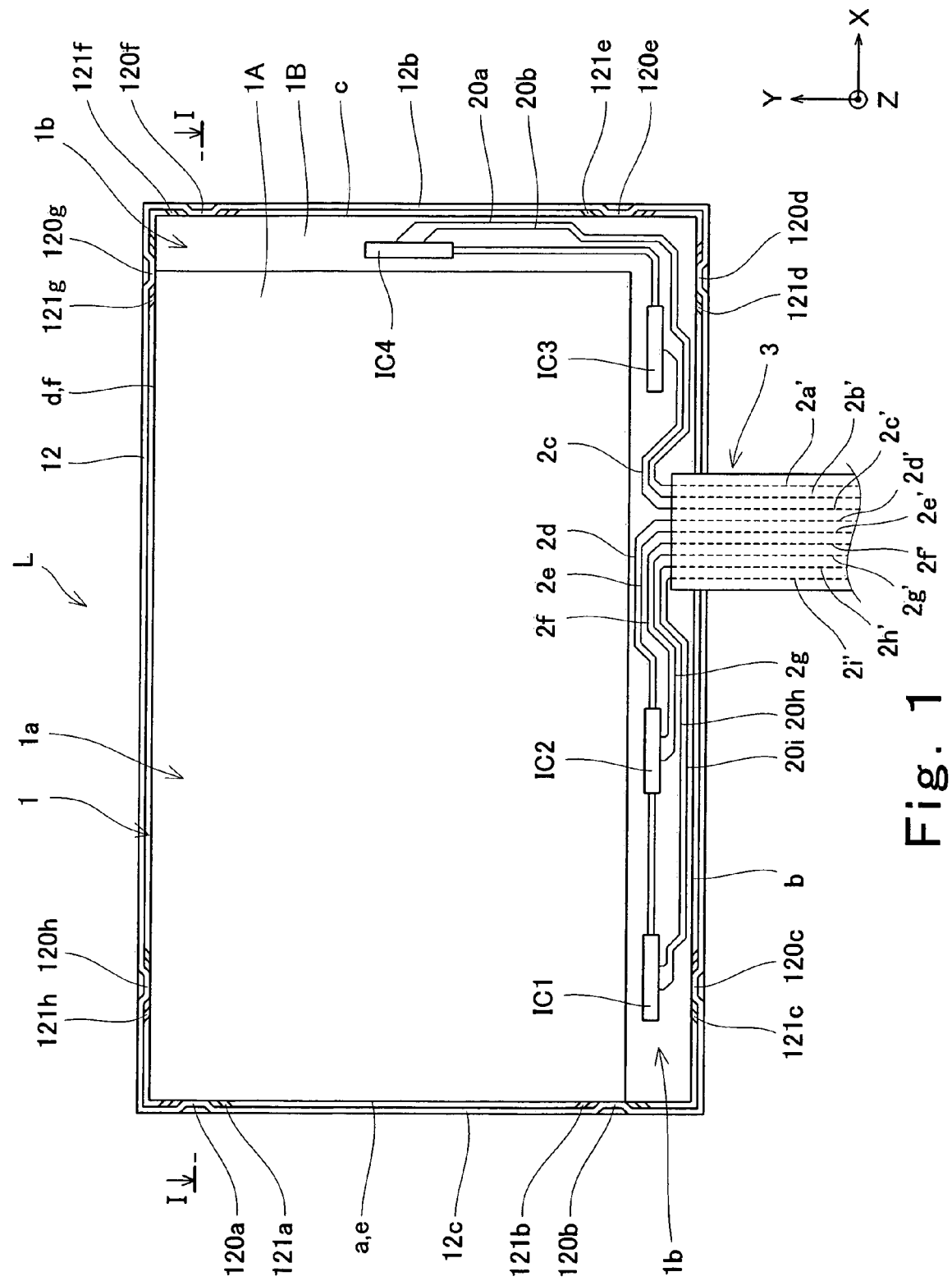
FIG. 1 is a plan view showing a structure of a liquid crystal display device according to an embodiment of the present invention.
Figure 2:
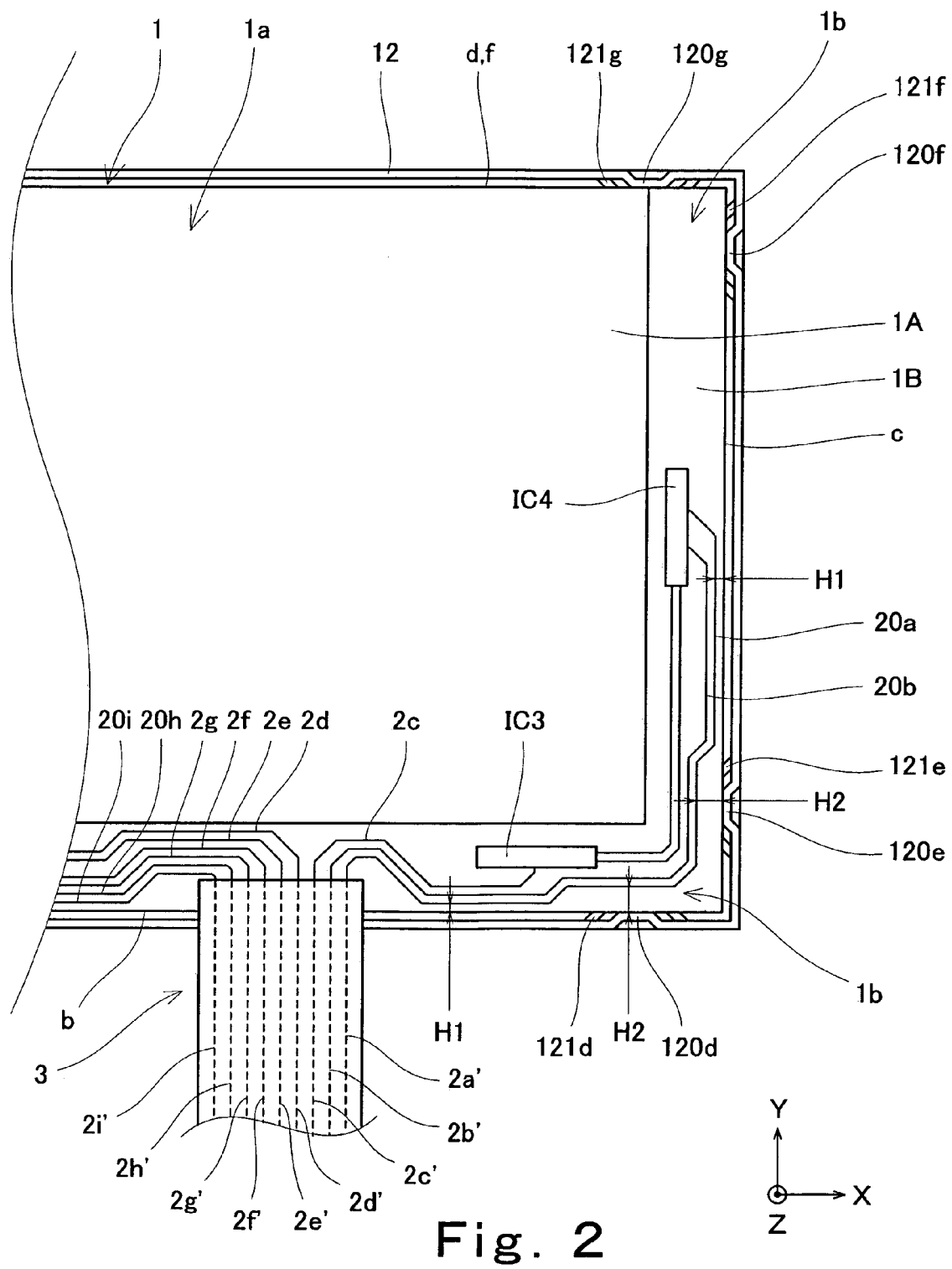
FIG. 2 is an enlarged plan view showing the structure of the liquid crystal display device according to the embodiment of the present invention.
Figure 3:
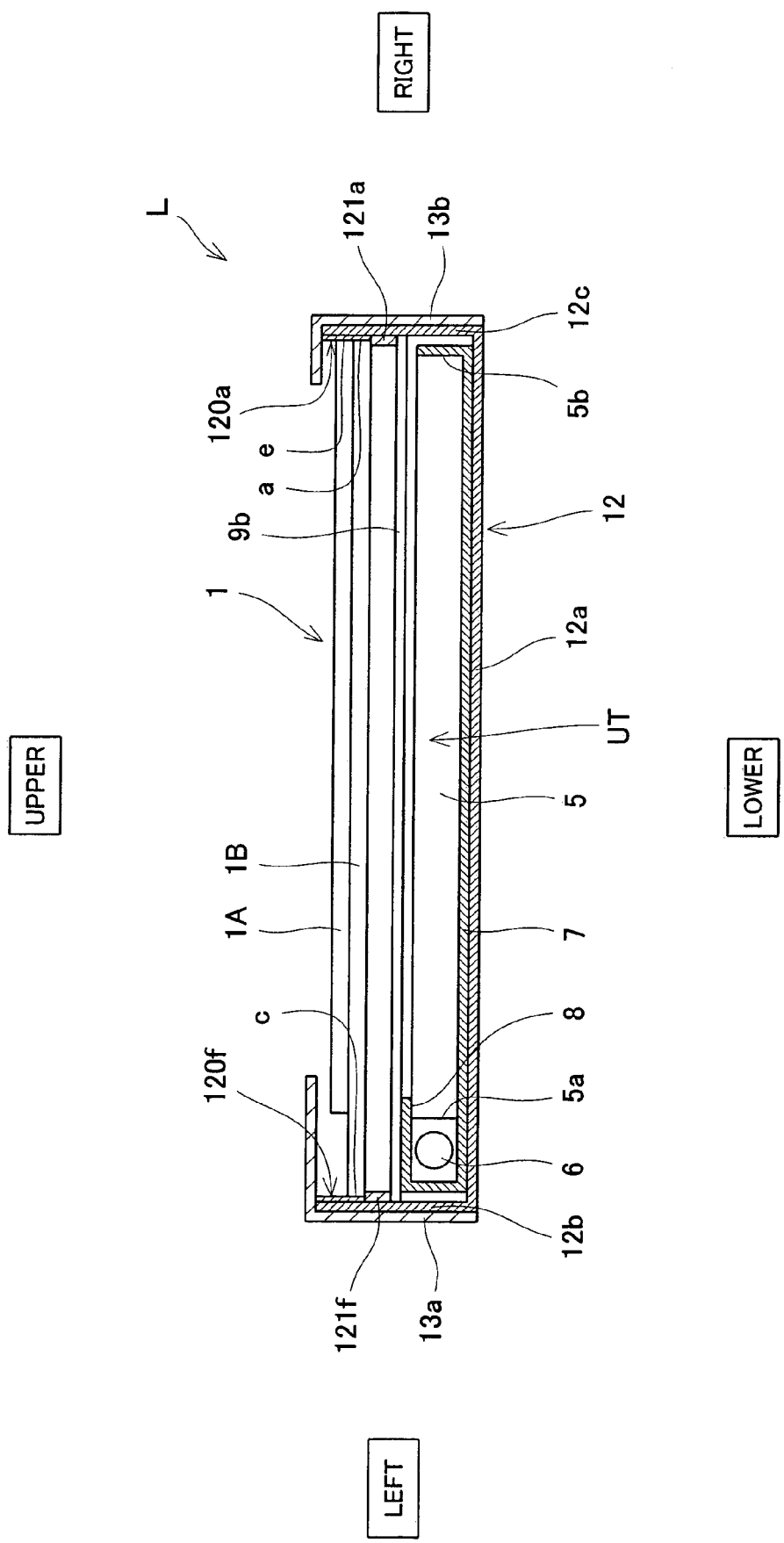
FIG. 3 is a cross-sectional view taken along line I-I in FIG. 1.
Figure 4:
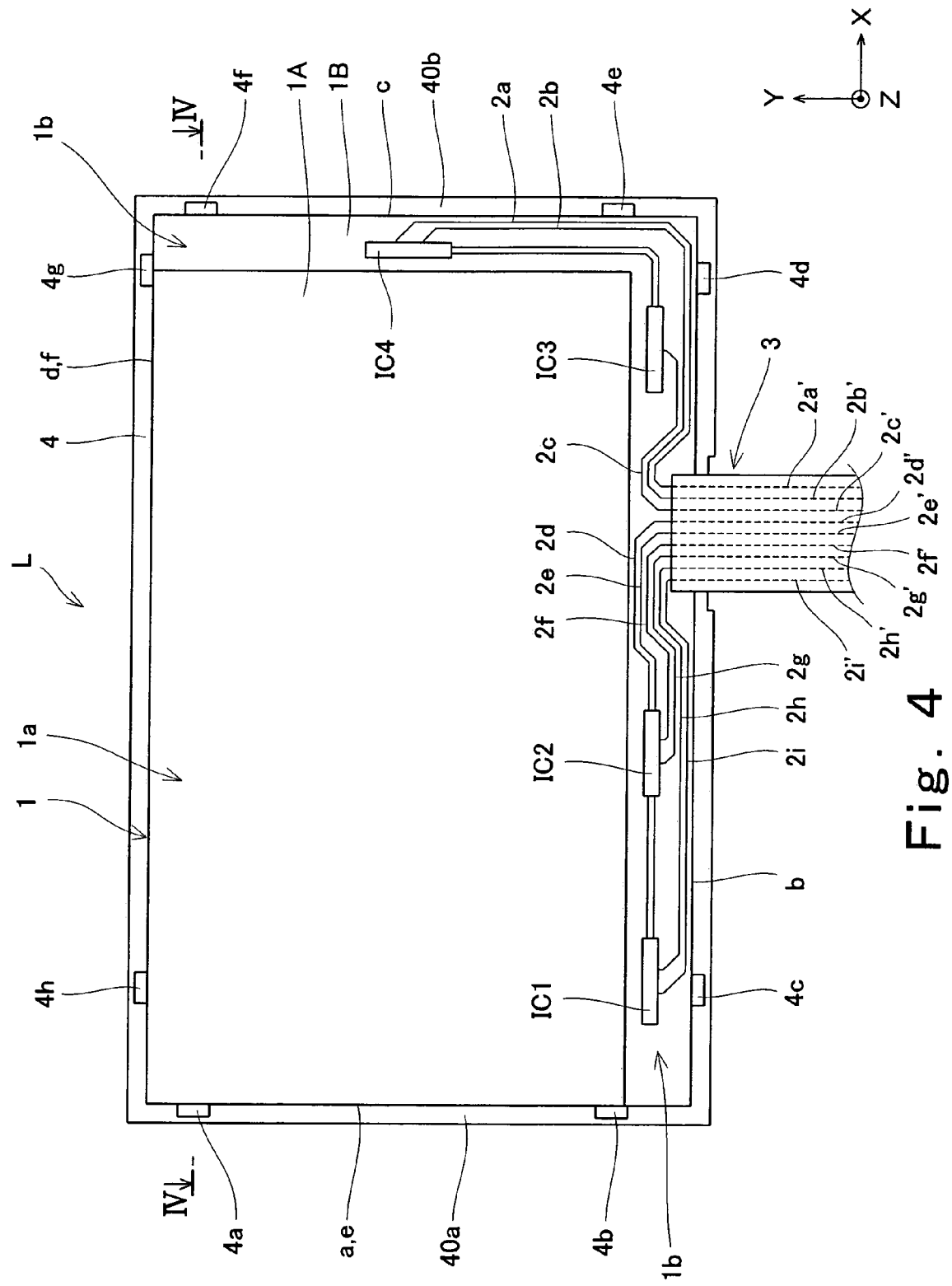
FIG. 4 is a plan view showing a structure of a conventional liquid crystal display device.
Figure 5:
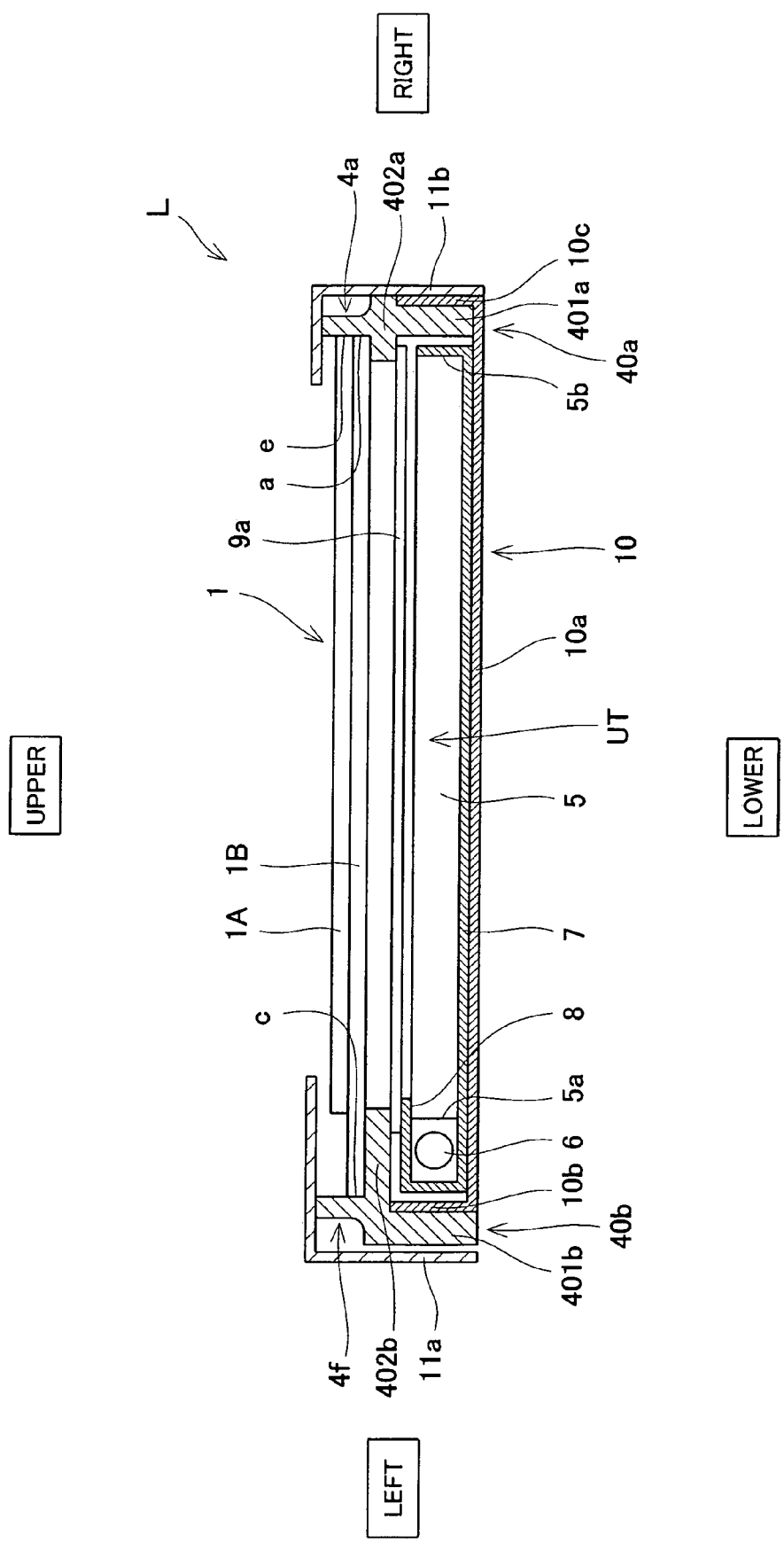
FIG. 5 is a cross-sectional view taken along line IV-IV in FIG. 4.

FIG. 1 is a plan view showing a structure of a liquid crystal display device according to the embodiment of the present invention. And, FIG. 2 is an enlarged plan view showing the structure of the liquid crystal display device according to the embodiment of the present invention. And, FIG. 3 is a cross-sectional view taken along line I-I in FIG. 1. Herein, FIGS. 1 and 2 show a condition in which a front cover is eliminated. In FIGS. 1 and 2, X-axis, Y-axis, and Z-axis directions are defined as shown in the drawings. And, as a matter of convenience, in FIG. 3, a direction of the liquid crystal display device is shown as in the drawing.

A liquid crystal display device L according to the embodiment of the present invention illustrated in FIG. 1 comprises a rectangular liquid crystal display panel 1 configured to display an image according to an applied image signal, a rear cover 12 configured to support the liquid crystal display panel 1 in X-axis, Y-axis, and Z-axis directions, and a flexible printed circuit board 3 configured to transmit the image signal to the liquid crystal display panel 1.

As shown in FIG. 1, the liquid crystal display panel 1 according to this embodiment of the present invention is provided with a display region 1a for displaying an image, and a non-display region 1b located outside of the display region 1a. And, source drivers IC1 to IC3 and a gate driver IC4 each of which is a driving semiconductor device configured to drive the liquid crystal display panel 1 are mounted on predetermined positions of the non-display region 1b. These semiconductor devices are mounted to electrode terminals (not shown) formed on the predetermined positions of the non-display region 1b by a COG process. And, a plurality of wires (not shown) extend from the electrode terminals to which the source drivers IC1 to IC3 and the gate driver IC4 are mounted, and are electrically connected to the source lines and the gate lines (not shown) provided on the display region 1a of the liquid crystal display panel 1. And, wires 20a, 20b, 2c to 2g, 20h, and 20i extend in predetermined shapes from the electrode terminals to which the source drivers IC1 to IC3 and the gate driver IC4 are mounted, and are electrically connected to flexible printed circuit board connecting electrode terminals (not shown) formed on predetermined positions of the non-display region 1b. Wires 2a' to 2i' capable of being electrically connected to wires 20a, 20b, 2c to 2g, 20h and 20i formed on the non-display region 1b of the liquid crystal display panel 1 are formed on the flexible printed circuit board 3, and electrode terminals (not shown) are formed on end portions of the wires 2a' to 2i' on a liquid crystal display panel 1 side. And, the liquid crystal display panel 1 and the flexible printed circuit board 3 are integral with each other such that the corresponding electrode terminals are electrically connected by means of the anisotropic conductive adhesive.

Now, a shape of the wire 20a according to this embodiment of the present invention will be described in detail with reference to FIG. 2. As shown in FIG. 2, an outermost wire 20a provided on the non-display region 1b of a substrate 1B is formed to have a portion which is spaced a predetermined distance H1 apart from a portion of an end face b of the substrate 1B which does not contact a supporting portion (holding portion) 120d and is substantially parallel to the end face b. And, the wire 20a is also formed to have a portion which is spaced the predetermined distance H1 apart from a portion of an end face c of the substrate 1B which does not contact supporting portions 120e and 120f and is substantially parallel to the end face c. In addition, the wire 20a is formed to have a portion spaced a predetermined distance H2 larger than the predetermined distance H1 apart from a portion of the end face b of the substrate 1B which contacts the supporting portion 120d and is substantially parallel to the end face b. And, the wire 20a is also formed to have a portion spaced the predetermined distance H2 larger than the predetermined distance H1 apart from a portion of the end face c of the substrate 1B which contacts the supporting portion 120e and is substantially parallel to the end face c.

And, as shown in FIGS. 1 and 2, in this embodiment of the present invention, a housing is formed by the rear cover 12 which is a thin metal plate. And, supporting portions 120a to 120h are formed on predetermined positions of the rear cover 12. The supporting portions 120a to 120h are formed so as to protrude in convex shape from side surfaces of the rear cover 12 and in parallel with X-axis or Y-axis direction from predetermined positions of the rear cover 12 so as to have the same length in Z-axis direction. And, the liquid crystal display panel 1 is disposed on a predetermined position on the rear cover 12 in such a manner that the end faces a to d of the substrate 1B forming the liquid crystal display panel 1 and adjacent end faces e and f of an opposed substrate 1A forming the liquid crystal display panel 1, contact side surfaces of the supporting portions 120a to 120h formed on the rear cover 12. In other words, the liquid crystal display panel 1 is fixed on the rear cover 12 in X-axis and Y-axis directions by means of the supporting portions 120a to 120h.

As shown in FIG. 3, the liquid crystal display device L according to this embodiment of the present invention comprises a rectangular flat-plate-shaped transparent light guiding plate 5 configured to transmit light in a direction parallel to a principal surface thereof. And, a light source 6 is provided along one end face 5a of the light guiding plate 5 by a fixing means not shown. Furthermore, a reflecting sheet 7 is provided so as to enclose the light source 6 and to contact a lower surface and an opposing end face 5b of the light guiding plate 5. The reflecting sheet 7 encloses the light source 6 so as to be substantially in U-shape in cross-section. And, the reflecting sheet 7 is fixed to the light guiding plate 5 in such a manner that an adhesion surface 8 of one end portion of the reflecting sheet 7 is bonded to the light guiding plate 5 by means of a double face adhesive tape (not shown). In other words, in the liquid crystal display device L according to the embodiment of the present invention illustrated in FIG. 3, the light source 6 is disposed along the end face 5a of the light guiding plate 5, and, the light source 6, the light guiding plate 5, and the reflecting sheet 7 compose an edge light type lighting unit UT.

The rear cover 12 is provided so as to contact a lower surface of the lighting unit UT. The rear cover 12 comprises a rectangular plate-shaped body portion 12a disposed to extend in a right-left direction, and rectangular plate-shaped vertical portions 12c and 12b formed to extend upward from right and left ends of the body portion 12a so as to have the same length. In other words, the lighting unit UT is provided so as to have predetermined spacings between the same and the vertical portions 12b and 12c of the rear cover 12 and to contact an upper surface of the body portion 12a of the rear cover 12. And, supporting portions 121a and 121f for supporting the liquid crystal display panel 1 from below are formed on the vertical portions 12b and 12c of the rear cover 12, in addition to the supporting portions 120a and 120f. A rectangular plate-shaped light correction sheet 9b for uniformizing light is provided so as to extend from a lower portion of a tip end portion of the supporting portion 121a to a lower portion of a tip end portion of the supporting portion 121f. And, the liquid crystal display panel 1 is provided so as to extend from an upper portion of the supporting portion 121a to an upper portion of the supporting portion 121f. The liquid crystal display panel 1 is fixed to the rear cover 12 in such a manner that predetermined regions of the liquid crystal display panel 1 are bonded to the upper portions of the supporting portions 121a and 121f. And, the liquid crystal display panel 1 is disposed on a predetermined position of the rear cover 12 in such a manner that the end faces a and c of the substrate 1B contact side surfaces of the supporting portions 120a and 120f, and the end face e of the opposed substrate 1A contacts the side surface of the supporting portion 120a. Front covers 13a and 13b in L-shape in cross-section are provided so as to cover the non-display region 1b of the liquid crystal display panel 1 and the rear covers 12b and 12c. The front covers 13a and 13b are provided so as to have minute spacings between the same and an upper surface of the liquid crystal display panel 1 and to contact the vertical portions 12b and 12c of the rear cover 12.

The light guiding plate 5 is made of a material such as acrylic resin. And, the reflecting sheet 7 is formed by a white resinous film having a light reflectivity, for example.

In the liquid crystal display device L thus structured, the lighting unit UT is supported by the rear cover 12. And the liquid crystal display panel 1 is suitably supported by the rear cover 12.

The light emitted from the light source 6 enters the end face 5a of the light guiding plate 5. The light propagates within the light guiding plate 5 and emanates from an upper surface thereof. The light leaking out of the lower surface and the end face 5b of the light guiding plate 5 is returned into the light guiding plate 5 by means of the reflecting sheet 7. The light emanating from the upper surface of the light guiding plate 5 passes through the light correction sheet 9b, thereby achieving uniform intensity distribution. And, when the light which has passed through the light correction sheet 9b is passing through the liquid crystal display panel 1, transmissivity of the light in the liquid crystal display panel 1 is controlled by an image signal applied to the liquid crystal display panel 1, and thereby an image is displayed on the display region 1a of the liquid crystal display panel 1.

In this embodiment, the wire 20a provided on the non-display region 1b of the substrate 1B is formed to have a portion which is spaced the predetermined distance H2 larger than the predetermined distance H1 apart from the portion of the end face c of the substrate 1B which contacts the supporting portion 120e and is substantially parallel to the end face c. And, the wire 20i provided on the non-display region 1b of the substrate 1B is formed to have a portion spaced the predetermined distance H2 larger than the predetermined distance H1 apart from the portion of the end face b of the substrate 1B which contacts the supporting portions 120C and 120d and is substantially parallel to the end face b. Therefore, even when an excessive impact stress or the like is applied to portions of the liquid crystal display panel 1 which contact the supporting portions 120a to 120h due to fall or the like, and cracks are generated on these portions, occurrence of break of the wires 20a and 20i provided on the non-display region 1b can be inhibited. In addition, since the impact stress or the like is applied to the liquid crystal display panel 1 at limited positions which correspond to the supporting portions 120a to 120h of the rear cover 12, it is possible to control portions of the liquid crystal display panel 1 which may be damaged, by changing the positions of the supporting portions 120a to 120h in design. Consequently, it becomes possible to reduce occurrence of a problem that a normal image is not displayed in the display region 1a of the liquid crystal display panel 1.

The liquid crystal display panel 1 is required to resist falling of the liquid crystal display device L from a height of approximately 40 cm, considering actual use of the liquid crystal display device L. Accordingly, inventor of the present invention has performed a fall test of the liquid crystal display device L from a desk, and confirmed a relationship between a fall height which causes generation of an abnormal image and a distance between the supporting portions 120c, 120d and 120e of the rear cover 12, and the wires 20a and 20i within the liquid crystal display panel 1, as follows. When the predetermined distance H2 was set to 0.5 mm, a height which causes abnormal display was 20 cm. And, when the predetermined distance H2 was set to 1 mm, a height which causes abnormal display was 25 cm. However, when the predetermined distance H2 was set to 2 mm, the height which causes abnormal display was 50 cm. Therefore, it has been confirmed that the problem that the normal image is not displayed on the display region 1a of the liquid crystal display panel 1 is inhibited by setting the predetermined distance H2 in the liquid crystal display panel 1 to at least 2 mm or more. And, by setting the predetermined distance H2 to not less than 2 mm and not more than 5 mm, a small liquid crystal display device L is effectively obtained.

Although the supporting portions 120a to 120h for supporting the liquid crystal display panel 1 are provided on the rear cover 12 in this embodiment, they may be provided on the front cover, thereby obtaining a similar effect. And, the number and positions of the supporting portions 120a to 120h are not intended to be limited as long as the liquid crystal display panel 1 can be positioned.

Although the holding portions of the liquid crystal display panel 1 are supporting portions which contact the end faces of the substrates 1A and 1B in this embodiment, the liquid crystal display panel 1 may be interposed and held by these holding portions, for example, as long as the liquid crystal display panel 1 is supported.

Although the liquid crystal display device L having the lighting unit UT is described in this embodiment, the present invention is also applicable to a reflecting-type liquid crystal display device.

In addition, although the housing is formed by the rear cover 12 made of metal in this embodiment, the effects provided by the present invention are obtained by using housings made of other materials.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A liquid crystal display device according to the present invention is useful as a consumer and industrial liquid crystal display device.

The invention claimed is:

1. A liquid crystal display device comprising:
a liquid crystal display panel having one or more wires on a substrate thereof; and
a housing having holding portions configured to hold opposing end portions of the liquid crystal display panel,
wherein a spacing between a portion of an outermost wire of the one or more wires which is located in the vicinity of the holding portion and a portion of an edge of the substrate which is located in the vicinity of the holding portion is larger than a spacing between a portion of the outermost wire which is other than the portion located in the vicinity of the holding portion and a portion of the edge of the substrate which is other than the portion located in the vicinity of the holding portion, and
wherein the spacing between the portion of the outermost wire of the one or more wires which is located in the vicinity of the holding portion and the portion of the edge of the substrate which is located in the vicinity of the holding portion is not less than 2 mm and not more than 5 mm.

2. The liquid crystal display device according to claim 1, wherein the spacing between the portion of the outermost wire which is other than the portion located in the vicinity of the holding portion and the portion of the edge of the substrate which is other than the portion located in the vicinity of the holding portion is less than 2 mm.

3. A liquid crystal display device comprising:
a liquid crystal display panel having one or more wires on a substrate thereof; and
a housing having holding portions configured to hold opposing end portions of the liquid crystal display panel,
wherein a spacing between a portion of an outermost wire of the one or more wires which is located in the vicinity of the holding portion and a portion of an edge of the substrate which is located in the vicinity of the holding portion is larger than a spacing between a portion of the outermost wire which is other than the portion located in the vicinity of the holding portion and a portion of the edge of the substrate which is other than the portion located in the vicinity of the holding portion, and
wherein the spacing between the portion of the outermost wire which is other than the portion located in the vicinity of the holding portion and the portion of the edge of the substrate which is other than the portion located in the vicinity of the holding portion is less than 2 mm.

* * * * *